United States Patent
Nam et al.

(10) Patent No.: US 10,766,814 B2
(45) Date of Patent: Sep. 8, 2020

(54) ARTIFICIAL MARBLE COMPOSITION AND PRODUCTION METHOD FOR ARTIFICIAL MARBLE USING SAME

(71) Applicant: LG Hausys, Ltd., Seoul (KR)

(72) Inventors: Hae-Rim Nam, Seoul (KR); Seong-Hoon Yue, Seongnam-si (KR); Hwan-Seok Park, Seoul (KR); Jang-soon Kim, Seongnam-si (KR); Yea-Ri Song, Anyang-si (KR); Yu-Jun Kim, Anyang-si (KR); Min-Kyung Park, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 219 days.

(21) Appl. No.: 15/762,049

(22) PCT Filed: Nov. 29, 2016

(86) PCT No.: PCT/KR2016/013866
§ 371 (c)(1),
(2) Date: Mar. 21, 2018

(87) PCT Pub. No.: WO2017/095107
PCT Pub. Date: Jun. 8, 2017

(65) Prior Publication Data
US 2018/0282215 A1    Oct. 4, 2018

(30) Foreign Application Priority Data

Dec. 1, 2015   (KR) .................. 10-2015-0169666

(51) Int. Cl.
*C04B 26/06* (2006.01)
*C04B 7/32* (2006.01)
(Continued)

(52) U.S. Cl.
CPC ........ *C04B 24/2641* (2013.01); *B29C 67/243* (2013.01); *B44F 9/04* (2013.01);
(Continued)

(58) Field of Classification Search
None
See application file for complete search history.

(56) References Cited

U.S. PATENT DOCUMENTS 5,218,013 A  *  6/1993  Schock ............... B29C 43/02
                                                    523/209
2006/0267230 A1 * 11/2006 Rha ..................... C04B 26/06
                                                    264/39

(Continued)

FOREIGN PATENT DOCUMENTS

KR    1020060069323 A    6/2006
KR    1020070025445 A    3/2007
(Continued)

OTHER PUBLICATIONS

European Search Report dated Nov. 19, 2018, issued in corresponding European Patent Application No. 16871003.6.
(Continued)

*Primary Examiner* — Peter A Salamon
(74) *Attorney, Agent, or Firm* — Hauptman Ham, LLP

(57) ABSTRACT

Disclosed are an artificial marble composition having a natural marble texture, and a method for producing artificial marble using the same. The artificial marble composition according to the present invention comprises: a first resin mixture; and a second resin mixture which is added to the first resin mixture and has a viscosity different from the first resin mixture, wherein each of the first and second resin mixtures comprises a base resin and an inorganic filler, and wherein the second resin mixture further comprises a thixotropic agent.

8 Claims, 3 Drawing Sheets

(51) Int. Cl.
    *C04B 14/06*     (2006.01)
    *C04B 24/26*     (2006.01)
    *C04B 26/18*     (2006.01)
    *B44F 9/04*     (2006.01)
    *B29C 67/24*     (2006.01)
    *C04B 26/04*     (2006.01)
    *C04B 22/06*     (2006.01)
    *C04B 24/28*     (2006.01)
    *C04B 103/00*     (2006.01)
    *C04B 111/54*     (2006.01)

(52) U.S. Cl.
    CPC .......... *C04B 22/064* (2013.01); *C04B 22/066* (2013.01); *C04B 24/283* (2013.01); *C04B 26/04* (2013.01); *C04B 26/06* (2013.01); *C04B 26/18* (2013.01); *B29C 67/244* (2013.01); *C04B 2103/0085* (2013.01); *C04B 2111/545* (2013.01)

(56) References Cited

U.S. PATENT DOCUMENTS

2007/0004824 A1*   1/2007   Kim ..................... C04B 18/022
                                                              523/171

2010/0016492 A1*   1/2010   Nagelsdiek ............. C04B 26/02
                                                               524/433
2010/0029839 A1*   2/2010   Sung ..................... B29C 67/242
                                                               524/556
2018/0282215 A1*  10/2018   Nam ..................... C04B 22/064

FOREIGN PATENT DOCUMENTS

| | | |
|---|---|---|
| KR | 1020080041501 A | 5/2008 |
| KR | 1020100106756 A | 10/2010 |
| KR | 1020150119596 A | 10/2015 |
| KR | 10-2015-0132956 A | 11/2015 |
| WO | 2006/065106 A1 | 6/2006 |
| WO | 2007/001136 A1 | 1/2007 |
| WO | 2008/084948 A1 | 7/2008 |

OTHER PUBLICATIONS

International Search Report for Application No. PCT/KR2016/013866 dated Mar. 9, 2017.

* cited by examiner

[Fig. 1]
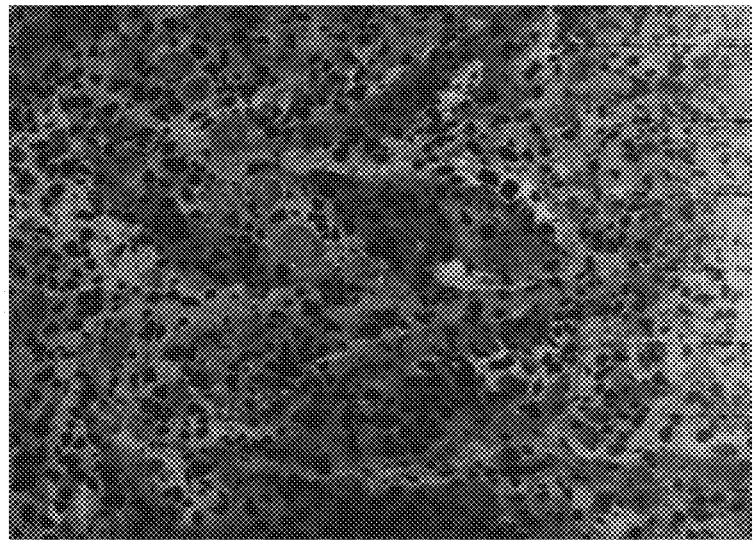
[Fig. 2]
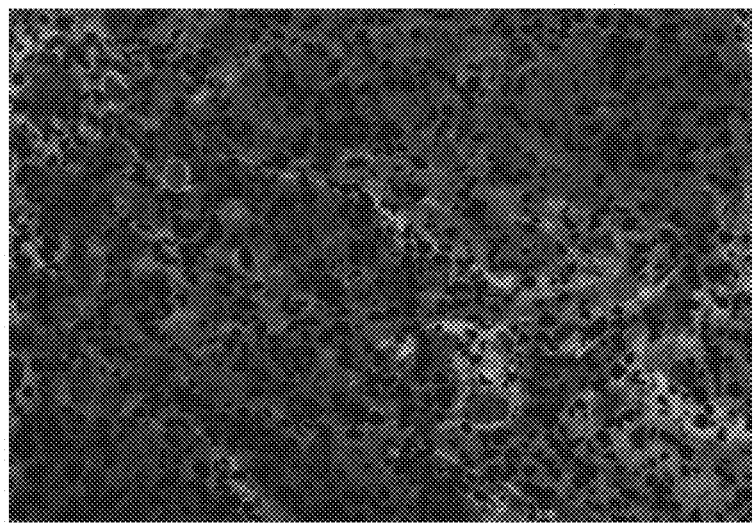

[Fig. 3]
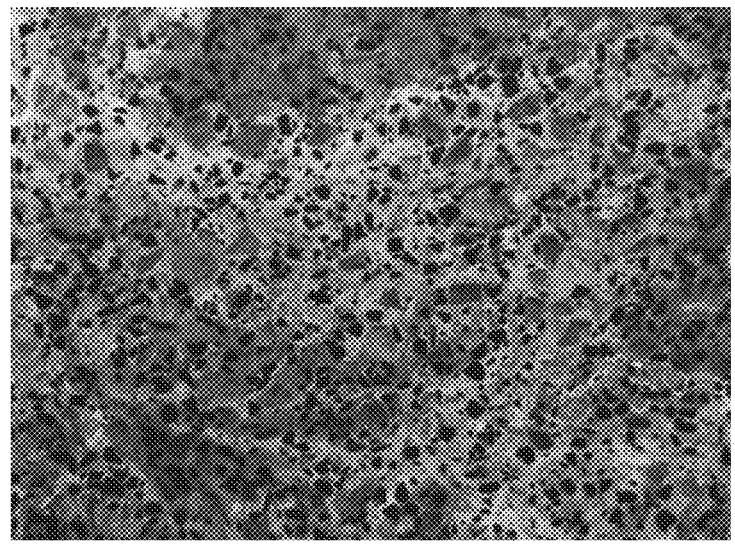
[Fig. 4]
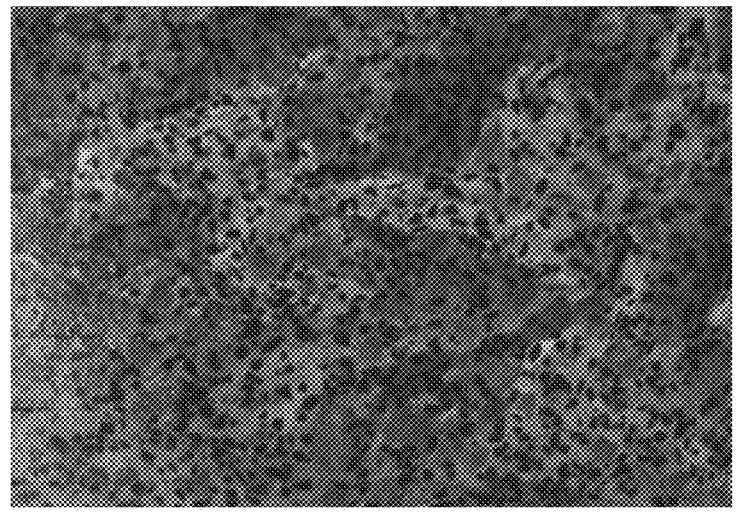

[Fig. 5]
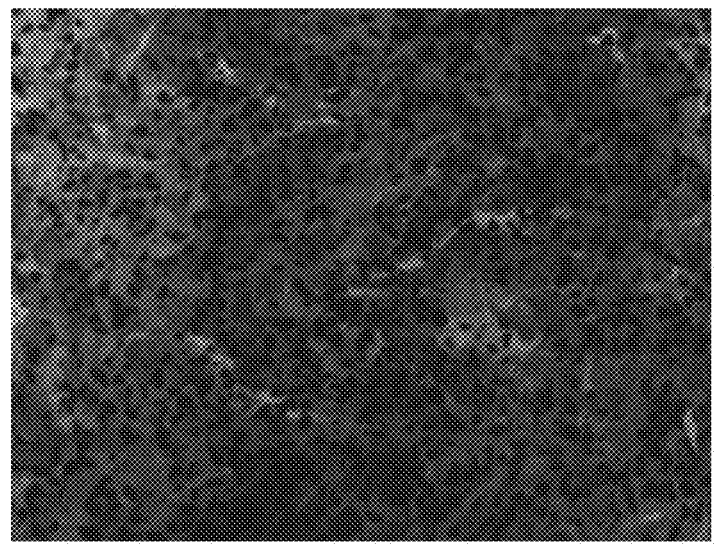
[Fig. 6]
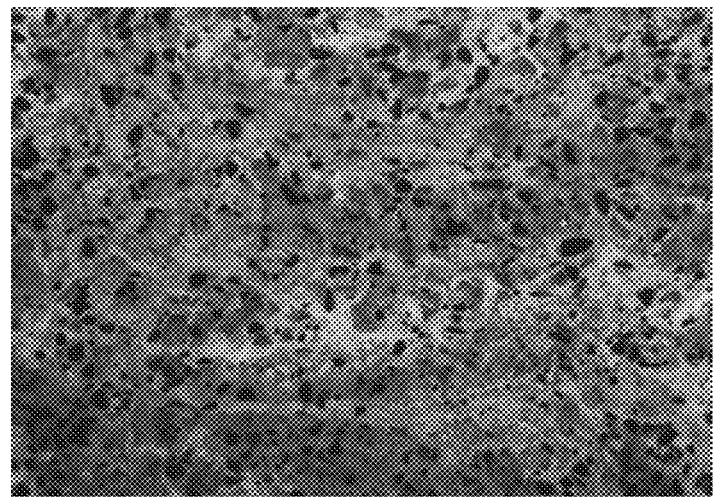

ARTIFICIAL MARBLE COMPOSITION AND PRODUCTION METHOD FOR ARTIFICIAL MARBLE USING SAME

CROSS REFERENCE TO RELATED APPLICATION

This present application is a national stage filing under 35 U.S.C § 371 of PCT application number PCT/KR2016/013866 filed on Nov. 29, 2016 which is based upon and claims the benefit of priority to Korean Patent Application No. 10-2015-0169666 filed on Dec. 1, 2015, in the Korean Intellectual Property Office. The disclosures of the above-listed applications are hereby incorporated by reference herein in their entirety.

TECHNICAL FIELD

The present invention relates to an artificial marble composition and a production method for artificial marble using the same, and more particularly, to an artificial marble composition having a natural stone texture and a production method for artificial marble using the same.

BACKGROUND ART

Artificial marble is an artificial composite in which a natural stone texture is implemented by blending an additive such as a natural stone powder, a mineral, and a resin chip, etc., into a base such as a synthetic resin such as an acrylic resin, an unsaturated polyester resin, and an epoxy resin, etc., or cement, and adding another additive such as pigment, etc., as needed.

Representative types of the artificial marble include acrylic artificial marble, polyester-based artificial marble, epoxy-based artificial marble, melamine-based artificial marble, and engineered stone (E-stone)-based artificial marble, etc. The artificial marble has a beautiful appearance and excellent workability, is lighter than natural marble, has excellent strength, and thus, the artificial marble is widely used as a counter table and various interior materials. The artificial marble, as it is known to date, implements an appearance effect mainly through a combination of monochrome opaque chips. However, this approach has a limit to implement a pattern similar to that of natural marble, granite, or the like, in the artificial marble. Accordingly, many studies are underway to develop artificial marble having an appearance close to that of natural marble.

As a part of studies, conventionally, in order to implement the pattern close to that of natural stone, a method of varying a chip shape, or a method of mixing or stacking resin mixtures of different colors in advance, followed by agitating with an agitator has been used. In addition, the mixtures of different colors are injected through nozzle movement to form a pattern.

However, when the chip shape is varied, it is not possible to have a connective pattern of natural stone. When a dichroic resin mixture is used, there is no clarity of the pattern possessed by natural stone because of blurring caused by using the same resin. Therefore, in order to implement the pattern similar to natural stone, it is necessary to control the clarity of the dichroic resin mixture.

A related prior art is Korean Patent Laid-Open Publication No. 10-2008-0041501 (published on May 13, 2008), which describes an artificial marble chip and a method for preparing the same.

DISCLOSURE

Technical Problem

It is an aspect of the present invention to provide an artificial marble composition capable of improving clarity of a pattern so as to be close to natural stone by mixing two kinds of compounds having different viscosity to implement a marble pattern, and a production method for artificial marble using the same.

Technical Solution

In accordance with one aspect of the present invention, an artificial marble composition includes: a first resin mixture; and a second resin mixture added to the first resin mixture and having a viscosity different from that of the first resin mixture, wherein each of the first and second resin mixtures includes a base resin and an inorganic filler, and a thixotropic agent is further added to the second resin mixture.

In accordance with another aspect of the present invention, a production method for artificial marble includes: (a) putting and casting a first resin mixture including a base resin and an inorganic filler into a mold; (b) injecting or stacking a second resin mixture including a base resin, an inorganic filler, and a thixotropic agent into the mold into which the first resin mixture is cast; and (c) agitating the first and second resin mixtures with an agitator to form a pattern, followed by curing and sanding.

Advantageous Effects

In the artificial marble composition according to the present invention and the production method for artificial marble using the same, the same kind of resin may be used as the first and second resin mixtures in order to have a pattern similar to that of natural stone, and the thixotropic agent may be added to only the second resin mixture to thereby impart the thixotropy in order to have the viscosity difference between the first and second resin mixtures, and thus, diffusing and mixing resistance between the first and second resin mixtures may be present due to the viscosity difference, thereby improving the pattern clarity.

DESCRIPTION OF DRAWINGS

FIG. 1 is an image showing a pattern of a sample produced according to Example 1.

FIG. 2 is an image showing a pattern of a sample produced according to Example 2.

FIG. 3 is an image showing a pattern of a sample produced according to Example 3.

FIG. 4 is an image showing a pattern of a sample produced according to Example 4.

FIG. 5 is an image showing a pattern of a sample produced according to Example 5.

FIG. 6 is an image showing a pattern of a sample produced according to Comparative Example 1.

BEST MODE

Advantages and features of the present invention and methods to achieve them are elucidated from exemplary embodiments described below in detail with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals refer to like components throughout the specification.

Hereinafter, an artificial marble composition according to a preferred embodiment of the present invention and a production method for artificial marble using the same are described in detail with reference to the accompanying drawings.

Artificial Marble Composition

The artificial marble composition according to an exemplary embodiment of the present invention includes a first resin mixture; and a second resin mixture added to the first resin mixture and having a viscosity different from that of the first resin mixture.

Here, each of the first and second resin mixtures includes a base resin and an inorganic filler, and a thixotropic agent is further added to the second resin mixture.

In other words, the artificial marble composition according to an exemplary embodiment of the present invention is prepared by mixing mixtures each formed of the same kind of resin in order to have a pattern similar to natural stone, and adding the thixotropic agent with respect to only one resin mixture, thereby imparting thixotropy to bring a viscosity difference, and thus, the two mixtures having the viscosity difference may have excellent diffusing and mixing resistance, thereby implementing excellent pattern clarity.

That is, the viscosity of the second resin mixture to which the thixotropic agent is added is higher than the viscosity of the first resin mixture to which the thixotropic agent is not added. Here, when the viscosity is simply high, great pressure and stress are required to transfer or agitate the first and second resin mixtures. When the thixotropic agent is added only to one resin mixture, the viscosity decreases as shear stress increases, and thus, additional facility capability is not required.

Accordingly, the same kind of resin may be used as the first and second resin mixtures in order for the artificial marble composition according to the exemplary embodiment of the present invention to have a pattern similar to that of natural stone, and the thixotropic agent may be added to only the second resin mixture to thereby impart the thixotropy in order to have the viscosity difference between the first and second resin mixtures, and thus, diffusing and mixing resistance between the first and second resin mixtures may be present due to the viscosity difference, thereby improving the pattern clarity.

Here, the first and second resin mixtures are preferably mixed in a weight ratio of 1:1 to 10:1. When the weight ratio of the first and second resin mixtures is less than 1:1, there is a problem in that an entire chip content is reduced, and thus, it is not similar to natural stone. On the contrary, when the weight ratio of the first and second resin mixtures is more than 10:1, there is a problem in that it is not possible to implement a rich marble pattern.

Each of the first and second resin mixtures includes 100 to 300 parts by weight of the inorganic filler based on 100 parts by weight of the base resin. In addition, each of the first and second resin mixtures may further include a chip to be added in an amount of 10 to 100 parts by weight, an initiator to be added in an amount of 0.1 to 1 part by weight, and a catalyst to be added in an amount of 1 part by weight or less, based on 100 parts by weight of the base resin. In addition, the thixotropic agent has an amount of 0.5 to 3.0 parts by weight based on 100 parts by weight of the second resin mixture.

Each base resin to be added to the first and second resin mixtures includes 20 to 70 parts by weight of a polyacrylic resin, a polyester-based resin or a polystyrene-based resin, 30 to 80 parts by weight of an acrylic monomer, an ester-based monomer or a styrene-based monomer, and 0.1 to 5 parts by weight of a polyfunctional monomer.

As a polymerizable monomer of the polyacrylic resin, the acrylic monomer, the ester-based monomer and the styrene-based monomer may be used, and among them, the acrylic monomer is preferably used. Specifically, as the acrylic monomer, acrylate-based monomers such as methyl methacrylate (MMA), ethyl methacrylate (EMA), butyl methacrylate (BMA), 2-ethylhexyl methacrylate (EHMA), benzyl methacrylate, etc., may be used, but the present invention is not limited thereto.

As the polyfunctional monomer, at least one selected from ethylene glycol dimethacrylate (EGDMA), 1,6-hexanediol diacrylate (HDDA), pentaerythritol triacrylate (PETIA) and trimethylolpropane triacrylate (TMPTMA) may be used, but the present invention is not limited thereto.

As the inorganic filler, any of inorganic powders such as calcium carbonate, aluminum hydroxide, silica, alumina, magnesium hydroxide, and calcium aluminate, etc., may be used alone or in combination of two or more thereof. An average particle size of the inorganic filler is preferably 1 to 100 μm. When the average particle size of the inorganic filler is less than 1 μm, viscosity of the resin mixture may be increase sharply, and when the average particle size thereof is more than 100 μm, an inorganic material may sink due to difference in specific gravity.

The inorganic filler is preferably added in an amount of 100 to 300 parts by weight based on 100 parts by weight of the base resin. When the added amount of the inorganic filler is less than 100 parts by weight based on 100 parts by weight of the base resin, an appropriate viscosity may not be exhibited during the production process. On the contrary, when the added amount of the inorganic filler is more than 300 parts by weight based on 100 parts by weight of the base resin, the viscosity of the resin composition may be excessively high, resulting in deterioration of moldability and deterioration of heat processability.

The thixotropic agent may be added only to one resin mixture, thereby imparting the thixotropy to bring the viscosity difference, and the two mixtures having the viscosity difference may have excellent diffusing and mixing resistance, thereby implementing excellent pattern clarity. Here, the viscosity of the second resin mixture to which the thixotropic agent is added is higher than the viscosity of the first resin mixture to which the thixotropic agent is not added. Here, when the viscosity is simply high, great pressure and stress are required to transfer or agitate the first and second resin mixtures. When the thixotropic agent is added only to one resin mixture, the viscosity decreases as shear stress increases, and thus, additional facility capability is not required.

Accordingly, the same kind of resin may be used as the first and second resin mixtures, and the thixotropic agent may be added to only the second resin mixture to thereby impart the thixotropy in order to have the viscosity difference between the first and second resin mixtures, and thus, diffusing and mixing resistance between the first and second resin mixtures may be present due to the viscosity difference, thereby improving the pattern clarity.

As the thixotropic agent, at least one selected from an inorganic-based thixotropic agent including synthetic fine silica-based, bentonite-based, and very fine precipitated calcium carbonate, a composite-based thixotropic agent including organic bentonite-based and surface-treated calcium carbonate-based, and an organic-based thixotropic agent including urea-based, metal stone gum-based, hydrogenated castor oil, polyamide wax, polyethylene oxide-based, vegetable oil-based, polymeric oil-based, flaxseed polymeric oil, and a fatty acid dimmer may be used.

In addition, the thixotropic agent preferably has an amount of 0.5 to 3.0 parts by weight based on 100 parts by weight of the second resin mixture. When the amount of the thixotropic agent is less than 0.5 part by weight based on 100 parts by weight of the second resin mixture, thixotropy is not imparted and the viscosity difference is insignificant. On the contrary, when the amount of the thixotropic agent is more than 3.0 parts by weight based on 100 parts by weight of the second resin mixture, the viscosity increases sharply, resulting in deterioration of workability and defoaming.

The chip is added as coloring means to express a natural stone texture. The chip is preferably a fine powder of 1 to 100 meshes. Specifically, any one of an acrylic chip, an epoxy-based chip, a styrene-based chip and a polyester-based chip may be used.

The chip is preferably added in an amount of 10 to 100 parts by weight based on 100 parts by weight of the base resin. When the added amount of the chip is less than 10 parts by weight based on 100 parts by weight of the base resin, coloring of the natural stone texture may not be properly implemented since the added amount thereof is insignificant. On the contrary, when the added amount of the chip is more than 100 parts by weight based on 100 parts by weight of the base resin, curing time may increase, and thus, physical properties may be deteriorated.

The initiator may be used without limitation as long as it is used in polymerization of the polyacrylic resin, but is preferably a peroxide-based initiator. Thus, as the initiator, at least one of peroxide-based initiators including tertiary butylcyclohexyl peroxydicarbonate, benzoyl peroxide, dicumyl peroxide, butyl hydroperoxide, cumyl hydroperoxide, t-butyl peroxymaleic acid, t-butyl hydroperoxide, acetyl peroxide, lauroyl peroxide, azobisisobutyronitrile, and azobisdimethylvaleronitrile is preferably used.

The initiator is preferably added in an amount of 1 to 10 parts by weight based on 100 parts by weight of the base resin.

The catalyst is added for the purpose of accelerating a polymerization rate. As the catalyst, an organic amine or an organic metal salt may be used.

The catalyst is preferably added in an amount of 1 or less part by weight based on 100 parts by weight of the base resin. When the added amount of the catalyst is more than 1 part by weight based on 100 parts by weight of the base resin, it is not economical since it may be a cause for raising the production cost only as compared to an increase in effect.

Further, each of the first and second resin mixtures may further include, in addition to the above-described components, at least one selected from the group consisting of silicone-based or non-silicone-based defoaming agent; silane-based, acid-based or titanate-based coupling agent such as trimethoxysilane, etc.; ultraviolet absorber such as phenyl salicylate-based, benzophenone-based, benzotriazole-based, nickel derivative-based or radical scavenger-based, etc.; halogen-based, phosphorus-based or inorganic metal-based flame retardant; stearic acid-based or silicone-based releasing agent; catechol-based or hydroquinone-based polymerization inhibitor; and phenol-based, amine-based, quinone-based, sulfur-based or phosphorus-based antioxidant may be further included within the range in which the physical properties of the present invention are not affected.

Production Method for Artificial Marble

The production method for artificial marble according to an exemplary embodiment of the present invention is now described.

First, a first resin mixture including a base resin and an inorganic filler is put and cast into a mold.

Then, a second resin mixture including a base resin, an inorganic filler, and a thixotropic agent is injected into or stacked in the mold into which the first resin mixture is cast.

Next, the first and second resin mixtures are agitated with an agitator to form a pattern, followed by curing and sanding to produce artificial marble. Here, the sanding process is performed to flatten a surface of the artificial marble so that the pattern included in the artificial marble is more clearly expressed on the surface. By this sanding process, it is possible to implement a design with more vivid and colorful pattern.

A production method for artificial marble according to another exemplary embodiment of the present invention is now described.

First, a first resin mixture including a base resin and an inorganic filler is put and cast into a mold while aligning a nozzle in which a second resin mixture including a base resin, an inorganic filler, and a thixotropic agent is stored on an upper part of the first resin mixture.

Next, the second resin mixture stored in the nozzle is dropped onto the first resin mixture to form a pattern, followed by curing and sanding to produce artificial marble. Here, an interval, a width, and a formation pattern of stripes may be freely adjusted by spraying the second resin mixture stored in the nozzle onto the first resin mixture.

A production method for artificial marble according to still another exemplary embodiment of the present invention is now described.

First, a first resin mixture including a base resin and an inorganic filler is mixed with a second resin mixture including a base resin, an inorganic filler, and a thixotropic agent to form a composite resin mixture.

Next, the composite resin mixture is put and cast into a mold, followed by curing and sanding to produce artificial marble.

In the production method for artificial marble according to exemplary embodiments of the present invention as described above, the same kind of resin may be used as the first and second resin mixtures in order to have a pattern similar to that of natural stone, and the thixotropic agent may be added to only the second resin mixture to thereby impart the thixotropy in order to have the viscosity difference between the first and second resin mixtures, and thus, diffusing and mixing resistance between the first and second resin mixtures may be present due to the viscosity difference, thereby improving the pattern clarity.

Example

Hereinafter, constitution and function of the present invention will be described in more detail through preferably exemplary embodiments of the present invention. It is to be noted that Examples to be described below are provided merely for specifically exemplifying the present invention, and accordingly, the present invention is not limited to the following Examples.

Descriptions which are not described in the specification can be sufficiently and technically deduced by a person skilled in the technical field, and accordingly, details thereof will be omitted.

1. Production of Artificial Marble

Example 1

Preparation of First Resin Mixture

A first resin mixture was prepared by mixing 30 wt % of a base resin, 55 wt % of aluminum hydroxide having an average particle size of 20 μm, and 15 wt % of an acrylic chip. Here, the base resin was composed of 30 wt % of polyacrylic resin, 67 wt % of methyl methacrylate (MMA), and 3 wt % of TMPTMA.

Preparation of Second Resin Mixture

A second resin mixture was prepared by mixing 35 wt % of a base resin, 63.5 wt % of aluminum hydroxide having an average particle size of 20 μm, and 1.5 wt % of BYK A410. Here, the base resin was composed of 30 wt % of polyacrylic resin, 67 wt % of methyl methacrylate (MMA), and 3 wt % of TMPTMA.

Production of Artificial Marble

After the first resin mixture was put and cast into a mold, the second resin mixture was injected into the mold into which the first resin mixture was cast, wherein a weight ratio of the first and second resin mixtures was 7:3. Next, the first and second resin mixtures were agitated 15 times with a rod having a diameter of 6 mm to form a pattern, and cured at 80□ for 50 minutes, followed by sanding to produce artificial marble.

Example 2

Artificial marble was produced in the same manner as in Example 1, except that 35 wt % of the base resin, 62 wt % of the aluminum hydroxide, and 3 wt % of BYK A410 were mixed in the preparation of the second resin mixture.

Example 3

Artificial marble was produced in the same manner as in Example 1, except that 35 wt % of the base resin, 64.5 wt % of the aluminum hydroxide, and 0.5 wt % of BYK A410 were mixed in the preparation of the second resin mixture.

Example 4

Artificial marble was produced in the same manner as in Example 1, except that 35 wt % of the base resin, 63 wt % of the aluminum hydroxide, and 0.5 wt % of Garamite 1958 were mixed in the preparation of the second resin mixture.

Example 5

Artificial marble was produced in the same manner as in Example 1, except that 35 wt % of the base resin, 62.5 wt % of the aluminum hydroxide, and 1.5 wt % of Garamite 1958 were mixed in the preparation of the second resin mixture.

Comparative Example 1

Artificial marble was produced in the same manner as in Example 1, except that 35 wt % of the base resin and 65 wt % of the aluminum hydroxide were mixed without adding a thixotropic agent in the preparation of the second resin mixture.

2. Evaluation of Physical Properties

Table 1 shows results of measurement of TI values with respect to Examples 1 to 5 and Comparative Example 1. Here, the TI values were measured with respect to the first resin mixtures and the second resin mixtures of Examples 1 to 5 and Comparative Example 1, respectively.

1) Measurement of TI value

The TI values were measured by using the Brookfield viscometer 64 spindle, and calculated by measuring the viscosities at 3 rpm and 30 rpm, respectively.

TABLE 1

| Classification | | Viscosity (Ps) | | Ti value |
|---|---|---|---|---|
| | | 3 rpm | 30 rpm | |
| Example 1 | First resin mixture | 207 | 93 | 2.22 |
| | Second resin mixture | 300 | 77 | — |
| | | | | 3.9 |
| Example 2 | First resin mixture | 207 | 93 | 2.22 |
| | Second resin mixture | 465 | 75 | — |
| | | | | 6.2 |
| Example 3 | First resin mixture | 207 | 93 | 2.22 |
| | Second resin mixture | 222 | 79 | — |
| | | | | 2.8 |
| Example 4 | First resin mixture | 207 | 93 | 2.22 |
| | Second resin mixture | 240 | 80 | — |
| | | | | 3.0 |
| Example 5 | First resin mixture | 207 | 93 | 2.22 |
| | Second resin mixture | 308 | 75 | — |
| | | | | 4.1 |
| Comparative Example 1 | First resin mixture | 207 | 93 | 2.22 |
| | Second resin mixture | 142 | 80 | — |
| | | | | 1.8 |

As shown in Table 1, the TI values of the first resin mixtures of Examples 1 to 5 and Comparative Example 1 were the same as 2.22 in all examples.

However, in Examples 1 to 5, it could be confirmed that the TI values of the second resin mixtures were 2.8 to 6.2, and thus, the difference in TI value between the first resin mixture and the second resin mixture was significantly increased. Accordingly, excellent pattern clarity could be secured.

On the other hand, in Comparative Example 1, the TI value of the second resin mixture was measured to be 1.8, which was not different from the TI value of the first resin mixture, and thus, it was expected that it would be difficult to secure the clarity of the pattern.

3. Observation of Sample Pattern

FIGS. 1 to 5 are images showing the patterns of the samples produced according to Examples 1 to 5, and FIG. 6 is an image showing a pattern of a sample produced according to Comparative Example 1.

As shown in FIGS. 1 to 5, it could be confirmed that in the artificial marbles produced according to Examples 1 to 5, the organic thixotropic agent was mixed with respect to only one compound of two compounds each formed of the same kind of resin, and thus, mixing resistance was present to exhibit the clear pattern.

On the other hand, as shown in FIG. 6, it could be confirmed that in the artificial marble produced according to Comparative Example 1, only two compounds each formed of the same kind of resin were mixed without adding the thixotropic agent in exhibiting the pattern, and thus, the pattern of design was blurred and the clarity of the pattern was not good.

Although the exemplary embodiments of the present invention have been described, various changes and modifications can be made by those skilled in the art without the scope of the appended claims of the present invention. Such changes and modifications should also be understood to fall within the scope of the present invention. Therefore, the protection scope of the present invention should be determined by the appended claims to be described below.

The invention claimed is:

1. An artificial marble composition comprising:
    a first resin mixture; and
    a second resin mixture added to the first resin mixture, wherein a viscosity of the second resin mixture is different from a viscosity of the first resin mixture,
    wherein each of the first and second resin mixtures comprises:
        a base resin;
        an inorganic filler;
        a chip, wherein an amount of the chip ranges from 10 parts by weight to 100 parts by weight based on 100 parts by weight of the base resin; and
        a catalyst, wherein the catalyst is an organic amine or an organic metal salt, and wherein an amount of the catalyst is 1 part by weight or less based on 100 parts by weight of the base resin,
    wherein the first resin mixture and the second resin mixture are mixed with each other, and a weight ratio between the first resin mixture and the second resin mixture ranges from 1:1 to 10:1, and
    wherein the second resin mixture further comprises a thixotropic agent, and wherein an amount of the thixotropic agent ranges from 0.5 part by weight to 3.0 parts by weight based on 100 parts by weight of the second resin mixture.

2. The artificial marble composition of claim 1, wherein the first resin mixture includes 100 to 300 parts by weight of the inorganic filler based on 100 parts by weight of the base resin, and
    the second resin mixture includes 100 to 300 parts by weight of the inorganic filler based on 100 parts by weight of the base resin.

3. The artificial marble composition of claim 1, wherein the base resin comprises:
    a polyacrylic resin, a polyester-based resin or a polystyrene-based resin, wherein an amount of the polyacrylic resin, the polyester-based resin or the polystyrene-based resin ranges from 20 parts by weight to 70 parts by weight based on 100 parts by weight of the base resin;
    an acrylic monomer, an ester-based monomer or a styrene-based monomer, wherein an amount of the acrylic monomer, the ester-based monomer or the styrene-based monomer ranges from 30 parts by weight to 80 parts by weight based on 100 parts by weight of the base resin; and
    a polyfunctional monomer, wherein an amount of the polyfunctional monomer ranges from 0.1 part by weight to 5 parts by weight based on 100 parts by weight of the base resin.

4. The artificial marble composition of claim 1, wherein the inorganic filler has an average particle size of 1 to 100 µm and includes at least one of calcium carbonate, aluminum hydroxide, silica, alumina, magnesium hydroxide, and calcium aluminate.

5. The artificial marble composition of claim 1, wherein each of the first and second resin mixtures further comprises an initiator, and wherein an amount of the initiator ranges from 0.1 part by weight to 1 part by weight based on 100 parts by weight of the base resin.

6. The artificial marble composition of claim 1, wherein the chip is any one of an acrylic chip, an epoxy-based chip, a styrene-based chip, and a polyester-based chip.

7. The artificial marble composition of claim 5, wherein the initiator includes at least one selected from the group consisting of tertiary butylcyclohexyl peroxydicarbonate, benzoyl peroxide, dicumyl peroxide, butyl hydroperoxide, cumyl hydroperoxide, t-butyl peroxymaleic acid, t-butyl hydroperoxide, acetyl peroxide, lauroyl peroxide, azobisisobutyronitrile, and azobisdimethylvaleronitrile.

8. The artificial marble composition of claim 1, wherein the thixotropic agent includes at least one selected from an inorganic-based thixotropic agent including synthetic fine silica-based, bentonite-based, and very fine precipitated calcium carbonate, a composite-based thixotropic agent including organic bentonite-based and surface-treated calcium carbonate-based, and an organic-based thixotropic agent including urea-based, metal stone gum-based, hydrogenated castor oil, polyamide wax, polyethylene oxide-based, vegetable oil-based, polymeric oil-based, flaxseed polymeric oil, and a fatty acid dimer.

* * * * *